(12) United States Patent
Liang et al.

(10) Patent No.: US 8,416,930 B2
(45) Date of Patent: Apr. 9, 2013

(54) APPARATUS AND METHOD FOR CONTROLLING AN AMOUNT OF CONCURRENT CALLS

(75) Inventors: Huasheng Liang, Shenzhen (CN); Baiou Wang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 13/146,416

(22) PCT Filed: Nov. 26, 2009

(86) PCT No.: PCT/CN2009/075148
§ 371 (c)(1),
(2), (4) Date: Jul. 27, 2011

(87) PCT Pub. No.: WO2010/094198
PCT Pub. Date: Aug. 26, 2010

(65) Prior Publication Data
US 2011/0280392 A1 Nov. 17, 2011

(30) Foreign Application Priority Data

Feb. 20, 2009 (CN) .......................... 2009 1 0105547

(51) Int. Cl.
*H04M 15/00* (2006.01)
(52) U.S. Cl. .................................. 379/112.04; 379/134
(58) Field of Classification Search .................. 370/352; 379/112.03, 112.04, 112.05, 114.07, 114.08, 379/134, 309
See application file for complete search history.

(56) References Cited

U.S. PATENT DOCUMENTS 5,060,258 A * 10/1991 Turner ........................... 379/134
5,291,550 A * 3/1994 Levy et al. .................... 379/242
5,825,861 A * 10/1998 Hoy ................................ 379/134
(Continued)

FOREIGN PATENT DOCUMENTS

CN 1340977 A 3/2002
CN 1980479 A 6/2007
(Continued)

OTHER PUBLICATIONS

International Search Report in international application No. PCT/CN2009/075148, mailed Feb. 25, 2010.
(Continued)

*Primary Examiner* — Ahmad Matar
*Assistant Examiner* — Oleg Asanbayev
(74) *Attorney, Agent, or Firm* — Fredrikson & Byron, P.A.

(57) ABSTRACT

The present invention discloses an apparatus and a method for controlling an amount of concurrent calls. The apparatus for controlling the amount of concurrent calls comprises a background processing module, a cooperation module and a core module, wherein the background processing module is arranged to provide an information configuration interface, configure a threshold for each of amounts of concurrent calls classified according to call characteristics, and send the threshold to the core module; the cooperation module is arranged to provide a variable for each of amounts of concurrent calls classified according to call characteristics and send the variable to the core module; and the core module is arranged to receive the threshold and the variable and control the cooperation module to release a current call when determining the variable is no less than the threshold. The present invention could limit the amount of concurrent calls corresponding to specific call characteristic under the threshold and thus improve the control of user calls.

5 Claims, 2 Drawing Sheets

U.S. PATENT DOCUMENTS

| | | | |
|---|---|---|---|
| 6,285,748 B1 * | 9/2001 | Lewis | 379/112.01 |
| 6,647,259 B1 | 11/2003 | Boyle et al. | |
| 6,983,039 B2 * | 1/2006 | Ishikawa et al. | 379/112.04 |
| 7,068,766 B1 * | 6/2006 | Ahn et al. | 379/112.04 |
| 7,286,654 B1 * | 10/2007 | Ahn et al. | 379/112.04 |
| 8,315,245 B2 * | 11/2012 | Savoor et al. | 370/352 |
| 2004/0005041 A1 * | 1/2004 | Zahir Azami | 379/112.06 |
| 2007/0135133 A1 | 6/2007 | Ishii et al. | |
| 2008/0101288 A1 | 5/2008 | Wan | |

FOREIGN PATENT DOCUMENTS

| | | | |
|---|---|---|---|
| CN | 101052232 A | 10/2007 | |
| EP | 1185123 A1 | 3/2002 | |
| KR | 20080044511 A | 5/2008 | |
| RU | 2007105873 A | 8/2008 | |

OTHER PUBLICATIONS

English Translation of the Written Opinion of the International Search Authority in international application No. PCT/CN2009/075148, mailed on Feb. 25, 2010.

* cited by examiner

APPARATUS AND METHOD FOR CONTROLLING AN AMOUNT OF CONCURRENT CALLS

RELATED APPLICATIONS

This application is a 35 U.S.C. 371 national stage filing from International Application No. PCT/CN2009/075148 filed Nov. 26, 2009 and claims priority to Chinese Application No. 200910105547.7 filed Feb. 20, 2009, the teachings of which are incorporated herein by reference.

TECHNICAL FIELD

The present invention relates to the field of mobile communication systems, particularly to an apparatus and a method for controlling an amount of voice concurrent calls accessing to a call center system at a service side of a Next Generation Call Center (NGCC) platform.

BACKGROUND

With the convergence of a communication network and a data network, and with the development and popularization of the Next Generation Network (NGN), the $3^{rd}$ Generation (3G) digital communication and other communication technologies, a call center system also develops to be grouped, intelligent and wide in bandwidth. An interactive multimedia intelligent IP call center system support platform with core technology of NGCC (NGCC platform) is particularly favored by operators at home and aboard. The NGCC platform is a call center platform constructed by using pure IP technology, thereby a call center system processes call accesses regardless of relay number and initiatively controls the amount of burst concurrent calls to prevent the abnormal offline of online users.

A user station and other equipments at an access side of an existing call center system based on the NGN are capable of controlling the amount of concurrent calls by themselves; however, this control is typically a limitation based on an analysis on a calling number and/or a called number and other network characteristics and is not suitable for limiting user calls with call characteristics such as access area, customer brand, customer level, service type and language type due to its thick control granularity. When a large number of burst calls occur in an access area, the accesses of the calls in other access areas may be affected, thus a certain level of impact on the call center platform can be caused.

SUMMARY

In order to solve the above problem that the controlling method in prior art is not suitable for limiting user calls with various call characteristics, an apparatus for controlling the amount of concurrent calls is provided, which is capable of limiting user calls with various call characteristics.

In addition, a method for controlling the amount of concurrent calls is further provided.

The apparatus for controlling the amount of concurrent calls comprises a background processing module, a cooperation module and a core module, wherein the background processing module is arranged to provide an information configuration interface, configure a threshold for each of amounts of concurrent calls classified according to call characteristics, and send the threshold to the core module;

the cooperation module is arranged to provide a variable for each of amounts of concurrent calls classified according to call characteristics and send the variable to the core module; and the core module is arranged to receive the threshold and the variable and controlling the cooperation module to release a current call when determining that the variable is no less than the threshold.

The core module may be further arranged to increase the variable when determining that the variable is less than the threshold, control the cooperation module to continue the call service, and correspondingly decrease the variable when the call service is over.

The method for controlling the amount of concurrent calls comprises:

pre-configuring a threshold for each of amounts of concurrent calls classified according to call characteristics;

providing a variable for each of amounts of concurrent calls classified according to call characteristics; and determining whether the variable is less than the threshold when each call accesses, and releasing the current call when determining the variable is no less than the threshold.

The method may further comprise: increasing the variable when determining the variable is less than the threshold, and continuing the call service; and correspondingly decreasing the variable when the call service is over.

The method may further comprise that, when there are multiple call characteristics, designating priorities of the call characteristics and determining in turn from high priority to low priority whether the variable corresponding to a call characteristic is less than the threshold until the call is released or continued.

In the above-mentioned method, the threshold may be configured to be a multiple of a maximum value of the amounts of concurrent calls classified according to call characteristics in a recent set time unit, and the multiple may be no less than 1.

The threshold may be further 1.2-1.5 times more than the maximum value of the amount of concurrent calls classified according to call characteristics in recent three months.

The method may further comprise that resetting the variable for each of amounts of concurrent calls classified according to call characteristics when an apparatus for controlling the amount of concurrent calls is powered on.

In the above-mentioned method, each variable may correspond to one counter by which the variable is increased or decreased.

The method may further comprise that, after configuring the threshold for each of amounts of concurrent calls classified according to call characteristics, generating a registration control message of the amount of concurrent calls by which the counter corresponding to the variable is started.

Compared with the prior art, the apparatus and method for controlling the amount of concurrent calls configures a threshold for each of amounts of concurrent calls classified according to call characteristics, compares the threshold with the variable for each of amounts of concurrent calls classified according to call characteristics, increases the variable to continue the current call when the variable is less than the threshold and decreases the variable after the call service is over, releases the current call when the variable is no less than the variable. By doing so, each of amounts of concurrent calls classified according to call characteristics could be limited to be under the threshold and thus improves the control of user calls.

The features and advantages of the present invention will be more explicit with reference to the detailed description on embodiments of the present invention in conjunction with the accompanying drawings.

DETAILED DESCRIPTION

An apparatus and a method for controlling the amount of concurrent calls according to the present invention are detailed in conjunction with the accompanying drawings.

Figure 1:
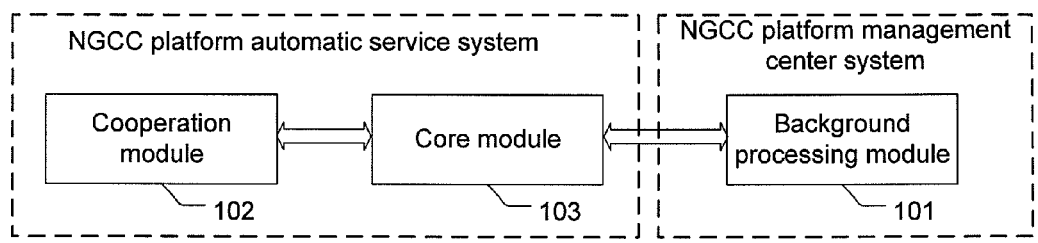
FIG. 1 is a schematic diagram illustrating modules of an apparatus for controlling the amount of concurrent calls according to the present invention.

FIG. 1 is a schematic diagram illustrating modules of an apparatus for controlling the amount of concurrent calls according to the present invention.

The apparatus for controlling the amount of concurrent calls comprises a background processing module 101, a cooperation module 102 and a core module 103. The background processing module 101 is developed in a Windows operating system and integrated with an NGCC platform management center system. The core module 103 and the cooperation module 102 are developed by using an automatic service script and embedded in an NGCC platform automatic service system. The core module 103 is respectively connected with the background processing module 101 and the cooperation module 102, and a TCP/IP protocol is adopted to conduct communications.

The background processing module 101 is arranged to provide an operator with an interface for configuring information about the amount of concurrent calls and store the configured information about the amount of concurrent calls into a database. The configured information about the amount of concurrent calls comprises a threshold Max for each of amounts of concurrent calls classified according to call characteristics. Max is N times more than the maximum value of the amounts of concurrent calls classified according to call characteristics in a recent set time unit, and N is no less than 1. For instance, the recent set time unit is set to be the recent three months, and N is set to be ranged from 1.2 to 1.5. Furthermore, when there are multiple call characteristics, the priority of each call characteristic is designated during configuring the information about the amount of concurrent calls.

The cooperation module 102 is arranged to provide a variable Num for each of amounts of concurrent calls classified according to call characteristics and send the current Num to the core module 103. Num represents the amount of concurrent calls that are normally conducted in the current system communication. Num is reset when the apparatus for controlling the amount of concurrent calls is powered on. The cooperation module 102 comprises a counter by which the cooperation module 102 increases or decreases Num. Each call characteristic corresponds to one counter.

The core module 103 is arranged to receive the information about the amount of concurrent calls sent by the background processing module 101 and Num sent by the cooperation module 102, parse Max from the information about the amount of concurrent calls, store Max into a memory in the form of an array, compare the threshold Max with the variable Num, and control the cooperation module 102 to continue or end the call service according to the result of the comparison. when each call accesses, the core module 103 determines whether Num is less than Max; if yes, Num is increased, the core module 103 controls the cooperation module 102 to continue the call service, and Num is correspondingly decreased when the call service is over; otherwise, the core module 103 controls the cooperation module 102 to release the call.

Figure 2:
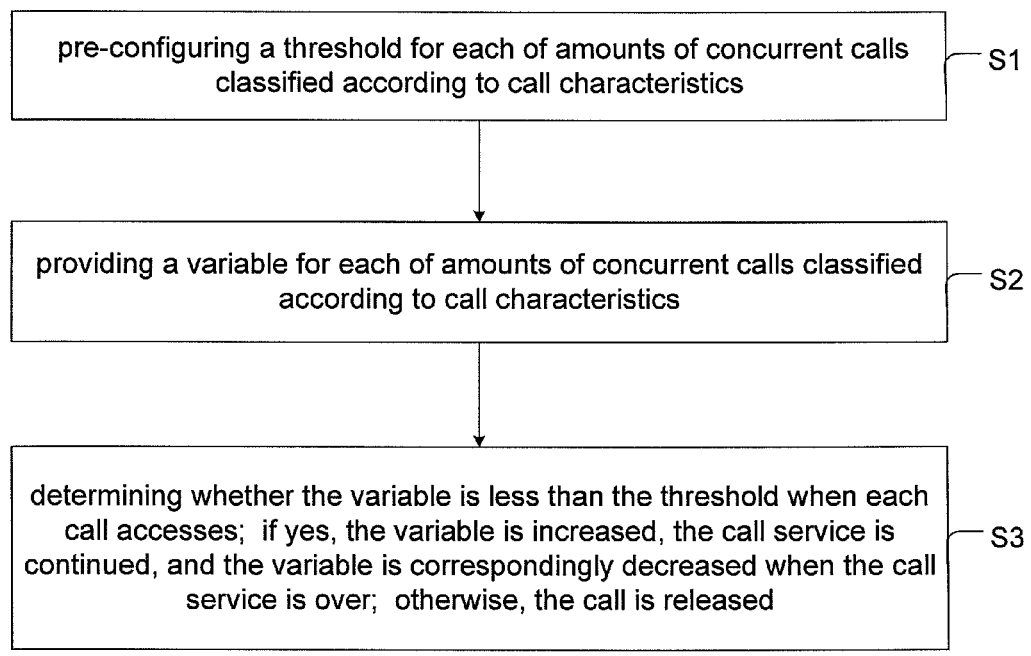
FIG. 2 is a flow chart of a method for controlling the amount of concurrent calls according to the present invention.

FIG. 2 is a flow chart of a method for controlling the amount of concurrent calls according to the present invention.

The method for controlling the amount of concurrent calls comprises the following steps.

Step S1: pre-configuring a threshold Max for each of amounts of concurrent calls classified according to call characteristics.

The background processing module 101 provides an interface for configuring information about the amount of concurrent calls, and sends the configured information about the amount of concurrent calls to the core module 103. The configured information about the amount of concurrent calls comprises Max. When there are multiple call characteristics, the configured information about the amount of concurrent calls comprises priority information of each call characteristic. The threshold corresponding to a call characteristic corresponds to the variable corresponding to the same call characteristic.

Step S2: providing a variable Num for each of amounts of concurrent calls classified according to call characteristics.

The cooperation module 102 provides Num and sends the current Num to the core module 103. Num is reset when the apparatus for controlling the amount of concurrent calls is powered on.

Step S3: determining whether Num is less than Max when each call accesses; if yes, Num is increased by 1 (i.e. Num+1), the call service is continued, and Num is decreased by 1 (i.e. Num−1) when the call service is over; otherwise, the call is released.

Figure 3:
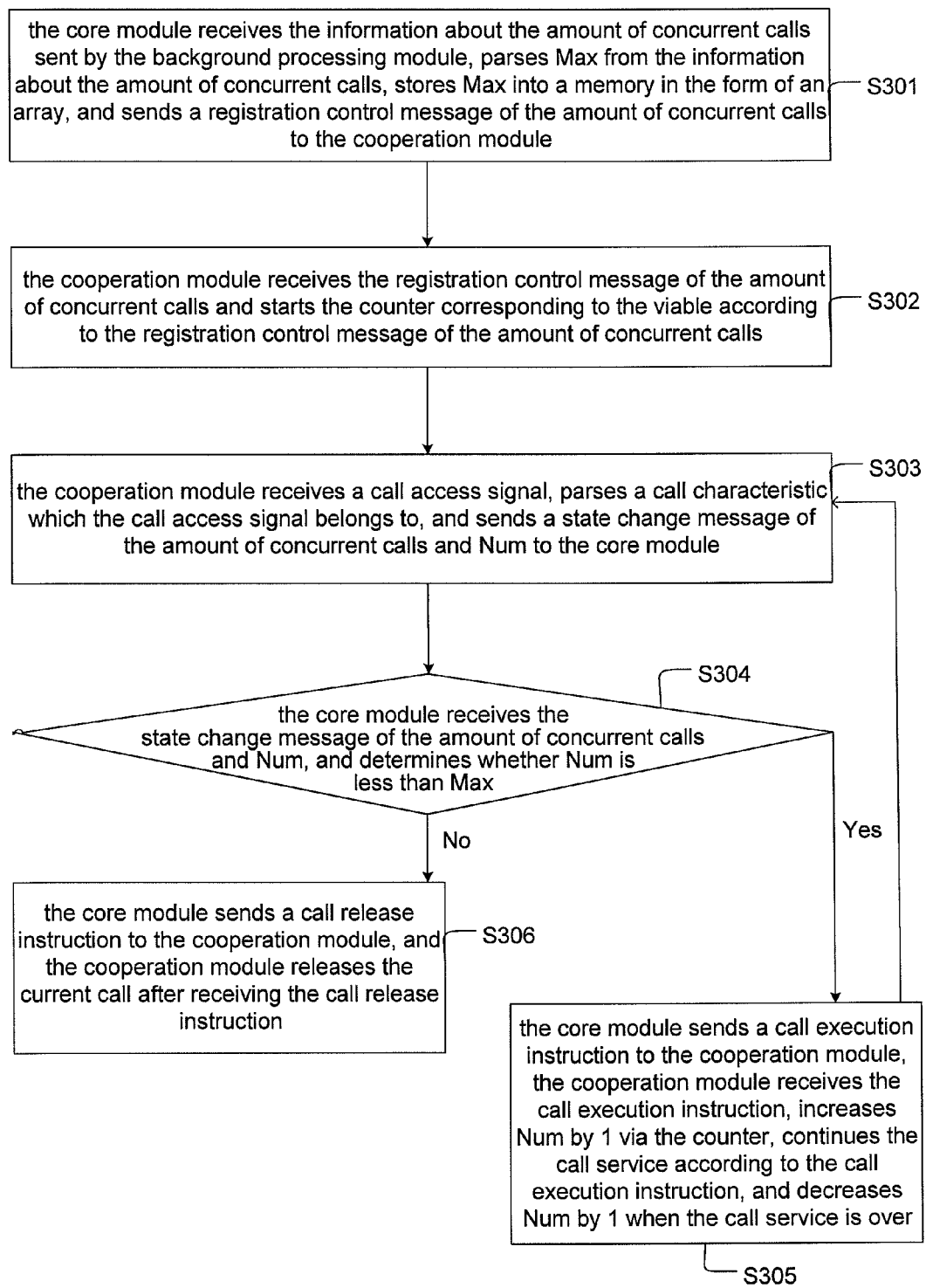
FIG. 3 is a schematic diagram illustrating a specific flow of step S3 in FIG. 2.

FIG. 3 is a schematic diagram illustrating a specific flow of step S3 in FIG. 2.

Step S3 specifically comprises the following steps.

Step S301: The core module 103 receives the information about the amount of concurrent calls sent by the background processing module 101, parses Max from the information about the amount of concurrent calls, stores Max into the memory in the form of an array, and sends a registration control message of the amount of concurrent calls to the cooperation module 102. The registration control message of the amount of concurrent calls comprises call characteristic information contained in the information about the amount of concurrent calls.

Step S302: The cooperation module 102 receives the registration control message of the amount of concurrent calls and starts the counter corresponding to Num according to the registration control message of the amount of concurrent calls.

Step S303: The cooperation module 102 receives a call access signal, parses a call characteristic which the call access signal belongs to, and sends a state change message of the amount of concurrent calls and Num to the core module 103.

Step S304: The core module 103 receives the state change message of the amount of concurrent calls and Num, and determines whether Num is less than Max; if yes, step S305 is executed; otherwise, step S306 is executed.

Step S305: The core module 103 sends a call execution instruction to the cooperation module 102, the cooperation module 102 receives the call execution instruction, increases Num by 1 (i.e. Num+1) via the counter, continues the call service according to the call execution instruction, and decreases Num by 1 (i.e. Num−1) when the call service is over. Then step S303 is executed.

Step S306: The core module 103 sends a call release instruction to the cooperation module 102, and the cooperation module 102 releases the current call after receiving the call release instruction.

In addition, when there are multiple call characteristics, determining in turn from high priority to low priority whether the variable corresponding to the call characteristic is less than the threshold until the call is released or continued.

The application of the method for controlling the amount of concurrent calls is described below by taking a one-dimensional call characteristic and a two-dimensional call characteristic for example.

In a first example, access area is taken as a one-dimensional call characteristic, which comprises area A and area B. The method for controlling the amount of concurrent calls comprises the following steps.

Step 1: The background processing module 101 configures information about the amount of concurrent calls which comprises a threshold A_Max for area A and a threshold B_Max for area B.

Step 2: The core module 103 loads the information about the amount of concurrent calls from the background processing module 101, writes A_Max and B_Max into the memory and stores them in the form of an array, and then sends a registration control message of the amount of concurrent calls for area A and a registration control message of the amount of concurrent calls for area B to the cooperation module 102.

Step 3: The cooperation module 102 receives the registration control message of the amount of concurrent calls for area A and the registration control message of the amount of concurrent calls for area B, and starts the counter for area A and the counter for area B.

Step 4: The cooperation module 102 receives a call from a customer in area A and sends a state change message of the amount of concurrent calls and a variable A_Num for area A to the core module 103. By dialing an access code provided by an operator, the customer can enter into an automatic service voice flow to make the call.

Step 5: The core module 103 receives the state change message of the amount of concurrent calls and A_Num for area A, compares A_Num with A_Max, and determines whether A_Num is less than A_Max; if yes, step S6 is executed; otherwise, step S7 is executed.

Step 6: The core module 103 sends a call execution instruction to the cooperation module 102; the cooperation module 102 receives the call execution instruction, increases A_Num by 1 (i.e. A_Num+1) via the counter for area A, and continues the call service according to the call execution instruction; when the call service is over, the cooperation module 102 releases the current call, and decreases A_Num by 1 (i.e. A_Num−1) via the counter for area A; and then step S4 is executed.

Step 7: The core module 103 sends a call release instruction to the cooperation module 102, and the cooperation module 102 releases the current call after receiving the call release instruction.

A customer voice call access processing flow for area B is similar to that for area A.

When the access area comprises multiple areas, the customer voice call access processing flow for which all can be done in the same manner.

In a second example, access area and customer brand are taken as a two-dimensional call characteristic, where the access area comprises area A and area B, and the customer brand comprises brand M and brand N. The method for controlling the amount of concurrent calls comprises the following steps.

Step 1: The background processing module 101 configures information about the amount of concurrent calls and designates priorities of call characteristics. It is pre-determined that the call characteristic 'access area' is prior to the call characteristic 'customer brand', that is, the priority of the call characteristic 'access area' is higher than that of the call characteristic 'customer brand'. The information about the amount of concurrent calls comprises a threshold A_Max for area A, a threshold A_M_Max for brand M in area A, a threshold A_N_Max for brand N in area A, a threshold B_Max for area B, a threshold B_M_Max for brand M in area B, and a threshold B_N_Max for brand N in area B.

Step 2: The core module 103 loads the predefined information about the amount of concurrent calls from the background processing module 101, writes A_Max, A_M_Max, A_N_Max, B_Max, B_M_Max and B_N_Max into the memory and stores them in the form of an array, and then sends the cooperation module 102 a registration control messages of the amount of concurrent calls for area A, a registration control messages of the amount of concurrent calls for brand M in area A, a registration control messages of the amount of concurrent calls for brand N in area A, a registration control messages of the amount of concurrent calls for area B, a registration control messages of the amount of concurrent calls for brand M in area B and a registration control messages of the amount of concurrent calls for brand N in area B.

Step 3: The cooperation module 102 receives the above-mentioned registration control messages, and starts the counter for area A, the counter for brand M in area A, the counter for brand N in area A, the counter for area B, the counter for brand M in area B and the counter for brand N in area B.

Step 4: The cooperation module 102 receives a call from a customer of brand M in area A and sends a state change message of the amount of concurrent calls and a variable A_Num for area A to the core module 103.

Step 5: The core module 103 receives the state change message of the amount of concurrent calls and A_Num for area A, compares A_Num with A_Max, and determines whether A_Num is less than A_Max; if yes, step S6 is executed; otherwise, step S8 is executed.

Step 6: The core module 103 sends a call execution instruction to the cooperation module 102; the cooperation module 102 receives the call execution instruction, increases A_Num by 1 (i.e. A_Num+1) via the counter for area A.

Step 7: Executing a call characteristic processing flow of brand M; step S7 comprises:

Step 7.1: the cooperation module 102 sends a state change message of the amount of concurrent calls and a variable A_M_Num for brand M in area A to the core module 103;

Step 7.2: the core module 103 receives the state change message of the amount of concurrent calls and A_M_Num for brand M in area A, compares A_M_Num with A_M_Max, and determines whether A_M_Num is less than A_M_Max; if yes, step S7.3 is executed; otherwise, step S7.4 is executed; and Step 7.3: the core module 103 sends a call execution instruction to the cooperation module 102; the cooperation module 102 receives the call execution instruction, increases A_M_Num by 1 (i.e. A_M_Num+1) via the counter for brand M in area A, and continues the call service according to the call execution instruction; when the call service is over, the cooperation module 102 releases the current call, and decreases A_M_Num by 1 (i.e. A_M_Num−1) via the counter for brand M in area A; and then step S4 is executed.

Step 8: the core module 103 sends a call release instruction to the cooperation module 102, and the cooperation module 102 releases the current call after receiving the call release instruction.

A call characteristic processing flow of brand N in area A is similar to that of brand M in area A.

A customer voice call access processing flow for area B is similar to that for area A.

When the access area comprises multiple areas and the customer brand comprises multiple brands, the customer voice call access processing flow for which all can be done in the same manner.

Compared with the prior art, the apparatus and method for controlling the amount of concurrent calls configures the threshold for each of amounts of concurrent calls classified according to call characteristics, compares the threshold with the variable for each of amounts of concurrent calls classified according to call characteristics, increases the variable to continue the current call when the variable is less than the threshold and decreases the variable after the call service is over, releases the current call when the variable is no less than the variable. By doing so, each of amounts of concurrent calls classified according to call characteristics could be limited to be under the threshold and thus improves the control of user calls.

The above descriptions are only preferred embodiments of the present invention, which are not to limit the present invention. Various modification and variations can be devised by those skilled in the art, and it should be understood that any modification, equivalent and improvement devised without departing from the spirit and scope of the present invention are contained in the protection scope of the present invention.

What is claimed is:

1. An apparatus for controlling an amount of concurrent calls, comprising:
   one or more processors and one or more memory devices in communication with the one or more processors, the one or more memory devices configured with instructions for causing the one or more processors to execute a background processing module, a cooperation module and a core module; wherein
   the background processing module is arranged to provide an information configuration interface, configure a threshold for each of amounts of concurrent calls classified according to call characteristics, and send the threshold to the core module;
   the cooperation module is arranged to provide a variable for each of amounts of concurrent calls classified according to call characteristics and send the variable to the core module;
   the core module is arranged to receive the threshold and the variable, and control the cooperation module to release a current call when determining that the variable is no less than the threshold;
   wherein the core module is further arranged to increase the variable when determining that the variable is less than the threshold, control the cooperation module to continue the call service, and correspondingly decrease the variable when the call service is over;
   wherein the background processing module is further arranged to designate priorities of the call characteristics when there are multiple call characteristics;
   wherein the core module is further arranged to determine in turn from high priority to low priority whether the variable corresponding to a call characteristic is less than the threshold until the call is released or continued; and
   wherein the threshold is configured to be 1.2-1.5 times more than the maximum value of the amounts of concurrent calls classified according to call characteristics in recent three months.

2. A method for controlling an amount of concurrent calls, comprising:
   operating one or more processors and one or more memory devices in communication with the one or more processors, the one or more memory devices configured with instructions for causing the one or more processors to control an amount of concurrent calls, the controlling the amount of concurrent calls comprising:
   providing, using a background processing module, an information configuration interface;
   configuring, using the background processing module, a threshold for each of amounts of concurrent calls classified according to call characteristics;
   sending, using the background processing module, the threshold to a core module;
   providing, using a cooperation module, a variable for each of amounts of concurrent calls classified according to call characteristics and sending the variable to the core module;
   receiving, using the core module, the threshold and the variable;
   determining, using the core module, whether the variable is less than the threshold when each call service accesses;
   controlling the cooperation module, using the core module, to release the current call when determining that the variable is no less than the threshold;
   increasing the variable, using the control module, when determining that the variable is less than the threshold, controlling the cooperation module to continue the call service, and correspondingly decreasing the variable using the core module when the call service is over;
   designating priorities of the call characteristics, using the background processing module, when there are multiple call characteristics; and
   determining, using the core module, in turn from high priority to low priority, whether the variable corresponding to a call characteristic is less than the threshold until the call is released or continued;
   wherein the threshold is configured to be 1.2-1.5 times more than the maximum value of the amounts of concurrent calls classified according to call characteristics in recent three months.

3. The method according to claim 2, further comprising: resetting the variable for each of amounts of concurrent calls classified according to call characteristics when an apparatus for controlling the amount of concurrent calls is powered on.

4. The method according to claim 2, wherein each variable corresponds to one counter by which the variable is increased or decreased.

5. The method according to claim 4, further comprising: after configuring the threshold for each of amounts of concurrent calls classified according to call characteristics, generating a registration control message of the amount of concurrent calls and starting the counter corresponding to the variable according to the registration control message.

* * * * *